United States Patent [19]

Ebneth et al.

[11] Patent Number: 4,614,684

[45] Date of Patent: Sep. 30, 1986

[54] REINFORCED COMPOSITE COMPRISING RESIN IMPREGNATED METALLIZED POLYARAMIDE FABRIC AND METHOD OF MAKING SAME

[75] Inventors: Harold Ebneth, Leverkusen; Lothar Preis, Bergisch-Gladbach; Henning Giesecke, Cologne; Gerhard D. Wolf, Dormagen, all of Fed. Rep. of Germany

[73] Assignee: Bayer Aktiengesellschaft, Leverkusen, Fed. Rep. of Germany

[21] Appl. No.: 419,098

[22] Filed: Sep. 16, 1982

[30] Foreign Application Priority Data

Oct. 2, 1981 [DE] Fed. Rep. of Germany ....... 3139313

[51] Int. Cl.$^4$ .................... B29C 43/20; B29D 9/00; B32B 15/08
[52] U.S. Cl. .................................. 428/252; 264/137; 264/258; 427/250; 428/267; 428/378; 428/392; 428/394; 428/418; 428/457
[58] Field of Search ................. 264/73, 74, 137, 257, 264/211, 258; 428/378, 379, 389, 395, 902, 381, 457, 392, 394, 418, 458; 523/205; 427/250, 251

[56] References Cited

U.S. PATENT DOCUMENTS

| | | | |
|---|---|---|---|
| 3,053,713 | 9/1962 | Juras | 264/257 |
| 3,060,522 | 10/1962 | Scheyer | 264/324 |
| 3,420,800 | 1/1969 | Haggis | 521/159 |
| 3,646,749 | 3/1972 | Clough et al. | 428/381 |
| 3,864,148 | 2/1975 | Maekawa et al. | 428/389 |
| 3,926,708 | 12/1975 | Long | 264/257 |
| 3,940,533 | 2/1976 | Arsac | 428/389 |
| 3,956,447 | 5/1976 | Denommee et al. | 264/135 |
| 3,967,010 | 6/1976 | MaeKawa | 428/389 |
| 4,084,399 | 4/1978 | Kanemaru et al. | 428/389 |
| 4,340,646 | 7/1982 | Ohno et al. | 428/432 |
| 4,377,607 | 3/1983 | Yoshida et al. | 427/250 |

FOREIGN PATENT DOCUMENTS

| | | | |
|---|---|---|---|
| 57908 | 8/1982 | European Pat. Off. . | |
| 2635114 | 2/1978 | Fed. Rep. of Germany . | |
| 2820502 | 11/1979 | Fed. Rep. of Germany . | |
| 2507123 | 12/1982 | France . | |
| 48-25065 | 7/1973 | Japan | 428/389 |
| 53-30974 | 3/1978 | Japan | 428/902 |
| 57-47351 | 3/1982 | Japan . | |
| 7003315 | 9/1970 | Netherlands | 428/389 |
| 1215002 | 12/1970 | United Kingdom | 428/389 |
| 1542153 | 3/1979 | United Kingdom . | |

OTHER PUBLICATIONS

Saunders et al, "Polyurethanes", Interscience, N.Y. (1962) pp. 64 and 65.
Whittington, Whittington's Dictionary of Plastics Technomic, Stamford, Conn., (1968), p. 50.

*Primary Examiner*—Willard E. Hoag
*Attorney, Agent, or Firm*—Sprung Horn Kramer & Woods

[57] ABSTRACT

A fabric reinforced composite having increased bond strength between impregnating resin and polyaramide reinforcing fabric and method for making the composite including using metal coated polyaramide fabric as the reinforcing material. The metal is deposited by a non-electrical method.

7 Claims, No Drawings

REINFORCED COMPOSITE COMPRISING RESIN IMPREGNATED METALLIZED POLYARAMIDE FABRIC AND METHOD OF MAKING SAME

This invention relates to the use of metallised aramide threads as a reforcing material.

A number of processes are known for chemically modifying reinforcing fibres to produce composite fibrous materials, such that an improvement in the adhesion between the fibre and matrix materials is achieved. The adhesion between the components is essential for many uses of composite materials, for example in the aviation industry.

Modification methods which prove effective in the case of, for example, glass fibres are unsuitable for aramide threads. Thus, the object of the present invention is to provide a method of modifying aramide threads, which allows the reinforcing action of these aramide fibres to be used to full capacity in the composite materials.

Surprisingly, it has been found that aramide threads which have excellent adhesion properties with respect to duroplastic plastics material are obtained when the aramide fibres are previously metallised without current. Composite materials produced from such metallised aramide threads and duroplastic plastics exhibit an increased tensile and flexing strength.

The term "aramide threads" as used herein is understood as also including the secondary products thereof, such as fibres, yarns and textile sheet structures.

Textile sheet structures include, for example, woven fabrics, worked fabrics, knit fabrics, non-woven fabrics and needle felts.

Aramide fibres are organic fibres which have a high E-modulus and are stable at elevated temperatures. They are described, for example in Ullmann's Enzyklopädie der Technischen Chemie, 4th Edition, Volume 11, pages 330–353.

Of course, those fully aromatic polyamides or copolyamides which optionally contain heterocycles and which also contain, incorporated therein, basic or acidic groups may also be used. Metallised aramide fibres are known from German Offenlegungsschrift No. 2,820,502.

Thus, the present invention provides the use of metallised aramide threads as a reinforcing material for duroplastic plastics threads, for example epoxy resins, unsaturated polyester resins, polyurethane resins or polyimide resins. The following are preferably included as metals: nickel, cobalt, copper, gold or silver, or alloys of these metals with each other or with iron. The metal layer on the monofil is from 0.05 to 10 μm thick, preferably from 0.1 to 1 μm thick.

Comparative experiments between nickel-plated and non-nickel-plated aramide fibres embedded in epoxy resins or in unsaturated polyester resins show that the tensile strength, the flexing strength and the E modulus of the composite material are increased by the metallisation operation. It is also advantageous for the composite materials reinforced with the metallised aramide fibres that as a result of the metallisation, electrically conductive substrates are produced. Consequently, depending on the thickness of the metal layer, protection against an electrostatic charge ranging to protection against lightning may be achieved.

When metals are used, for example nickel, cobalt, iron or alloys thereof with each other, a shield against electromagnetic radiation is obtained.

The metallisation operation may be carried out on the threads, fibres and yarns as well as on the textile sheet structures produced therefrom.

EXAMPLE 1

A fabric consisting of poly-p-phenyleneterephthalamide textile fibres having a surface weight of 62 g/m$^2$ was activated for 30 seconds in a solution of 0.25 g/l of butadiene-palladium chloride and then treated for 30 minutes at room temperature in a nickel bath. This bath contained 30 g/l of nickel chloride.6 H$_2$O, 10 g/l of citric acid and 3 g/l of dimethylamineborane. The pH of the bath was 8.5.

The fabric had absorbed 25 g/m$^2$ of nickel and exhibited a resistance per square of R=0.3 Ω.

A cobalt-plated fabric having the following values was produced accordingly: quantity of cobalt 14 g/m$^2$; resistance per square 3.5 Ω.

Samples of metallised fabric and of the same, but unmetallised fabric were imbedded as follows in epoxy resins. In the warp direction, the fabric was cut into strips 30 mm wide, the strips were impregnated separately with a cold-hardening epoxy resin based on bisphenol A (epoxy equivalent weight about 200) and penta-ethylenehexamine, and sufficient layers were introduced into a test body mould with dimensions of 200×30×2 mm to produce a layer thickness of 2 mm. The fibre content was 41.6% by weight. After hardening, the following physical properties were determined:

| Material | Tensile strength (MPa) | Elongation at break (%) |
| --- | --- | --- |
| Fabric, unmetallised | 290 | 1.4 ± 0.1 |
| Fabric, nickel-plated | 331 | 2.0 ± 0.05 |

| Material | Flexing strength (MPa) | E-modulus (MPa) |
| --- | --- | --- |
| Fabric, unmetallised | 221 | 17 429 |
| Fabric, nickel-plated | 325 | 20 417 |
| Fabric, cobalt-plated | 248 | 19 266 |

A comparison of the measured results shows a clear improvement in the flexing and tensile strength, and in the E-modulus and elongation at break of the metallised samples.

EXAMPLE 2

The following values were measured on test bodies analogous to Example 1, except that an unsaturated polyester resin based on isophthalic acid (fibres content 42.1% by weight) was used:

| Material | Flexing strength (MPa) | E-modulus (MPa) |
| --- | --- | --- |
| Fabric, unmetallised | 241 | 15 044 |
| Fabric, nickel-plated | 292 | 17 644 |

We claim:
1. A process of making a fiber reinforced molded resin product comprising
   (a) impregnating strips of polyaramide fabric with a resin selected from the group consisting of an epoxy resin, an unsaturated polyester resin, a polyurethane resin and a polyimide resin, (b) disposing plural layers of the resultant resin impregnated strips from step (a) in a mold and molding the resin impregnated strips thereon to cause hardening of the resin, fibers of said fabric having a metal layer deposited thereon without current.

2. A process according to claim 1, wherein the metal is selected from the group consisting of nickel, cobalt, copper, gold, silver alloys thereof with each other and alloys of said metal with iron.

3. A process according to claim 2, wherein the thickness of the metal on the is from 0.05 to 10 μm.

4. A process according to claim 1 wherein said metal is nickel.

5. A process according to claim 1 wherein said resin comprises an epoxy resin.

6. A reinforced molded material comprising a cured resin selected from the group consisting of an unsaturated polyester resin, a polyurethane resin, an epoxy resin and a polyimide resin, the resin being reinforced with plural fabric layers, the fabric being composed of metallised polyaramide fibers.

7. A reinforced material according to claim 1, wherein said metallised polyaramide fibers contain a metal selected from the group consisting of nickel, cobalt, copper, gold, silvers, alloys thereof with each other and alloys of said metal with iron.

* * * * *

UNITED STATES PATENT AND TRADEMARK OFFICE
CERTIFICATE OF CORRECTION

PATENT NO. : 4,614,684

DATED : September 30, 1986

INVENTOR(S) : Harold Ebneth, et al.

It is certified that error appears in the above-identified patent and that said Letters Patent is hereby corrected as shown below:

Col. 1, line 7      Delete "reforcing" and substitute --reinforcing--

Col. 1, line 49      Delete "threads" and substitute --materials--

Col. 2, line 8      Delete "1 9" and substitute --1-- after "EXAMPLE"

Signed and Sealed this

Tenth Day of February, 1987

Attest:

DONALD J. QUIGG

Attesting Officer      Commissioner of Patents and Trademarks